United States Patent [19]

Tamura et al.

[11] Patent Number: 5,081,608
[45] Date of Patent: Jan. 14, 1992

[54] APPARATUS FOR PROCESSING RECORD-STRUCTURED DATA BY INSERTING REPLACEMENT DATA OF ARBITRARY LENGTH INTO SELECTED DATA FIELDS

[75] Inventors: Noboru Tamura, Kawasaki; Yoshihiro Hayakawa, Tokyo; Masao Ito, Kawasaki; Kenichi Ueda, Tokyo, all of Japan

[73] Assignee: Matsushita Electric Industrial Co., Ltd., Japan

[21] Appl. No.: 339,769

[22] Filed: Apr. 18, 1989

[30] Foreign Application Priority Data

| Apr. 18, 1988 [JP] | Japan | 63-94817 |
|---|---|---|
| Apr. 18, 1988 [JP] | Japan | 63-94818 |

[51] Int. Cl.$^5$ .......................... G06F 15/417
[52] U.S. Cl. .................. 395/600; 364/962.1; 364/964; 364/974; 364/DIG. 2
[58] Field of Search ... 364/200 MS File, 900 MS File

[56] References Cited

U.S. PATENT DOCUMENTS

| 4,068,300 | 1/1978 | Bachman | 364/200 |
|---|---|---|---|
| 4,468,728 | 8/1984 | Wang | 364/200 |
| 4,648,036 | 3/1987 | Gallant | 364/300 |
| 4,648,064 | 3/1987 | Morley | 364/900 |
| 4,939,689 | 7/1990 | Davis et al. | 364/900 |
| 4,961,139 | 10/1990 | Hong et al. | 364/200 |
| 4,967,341 | 10/1990 | Yamamoto et al. | 364/200 |
| 4,982,346 | 1/1991 | Girouard et al. | 364/550 |
| 5,008,853 | 4/1991 | Bly et al. | 364/900 |
| 5,021,995 | 6/1991 | Quint et al. | 364/900 |

Primary Examiner—Michael R. Fleming
Assistant Examiner—Gopal C. Ray
Attorney, Agent, or Firm—Lowe, Price, LeBlanc & Becker

[57] ABSTRACT

A data processing apparatus for processing data structured as records, each record including a number of fields. The processing consists of replacing the contents of specific fields in specific records. The apparatus has a memory for storing a record to be processed, a memory for storing data to be used in replacement processing, a register for storing information designating specific record fields to be processed, and a control section for successively reading out the stored record fields. As each field is read out, either the field data or the replacement data are transferred as output data from the apparatus, in accordance with the corresponding information in the aforementioned register.

5 Claims, 9 Drawing Sheets

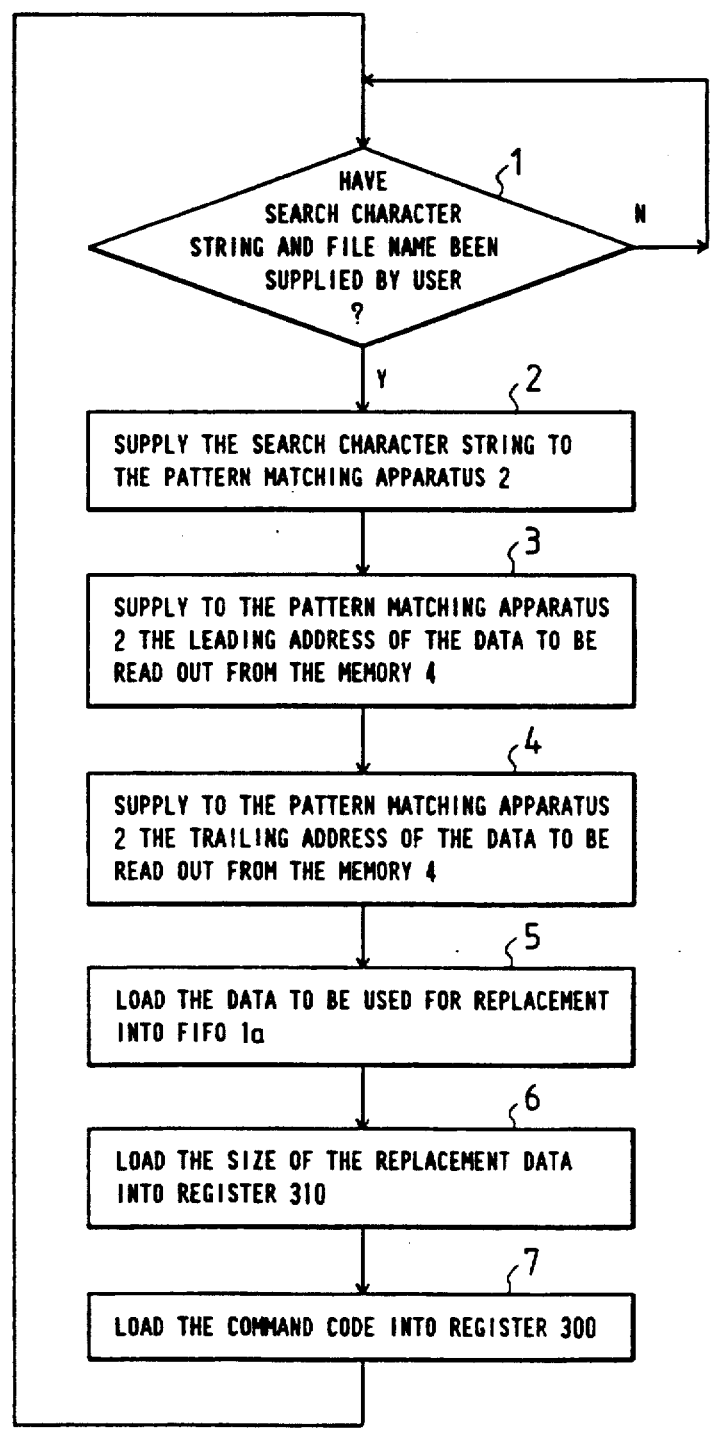

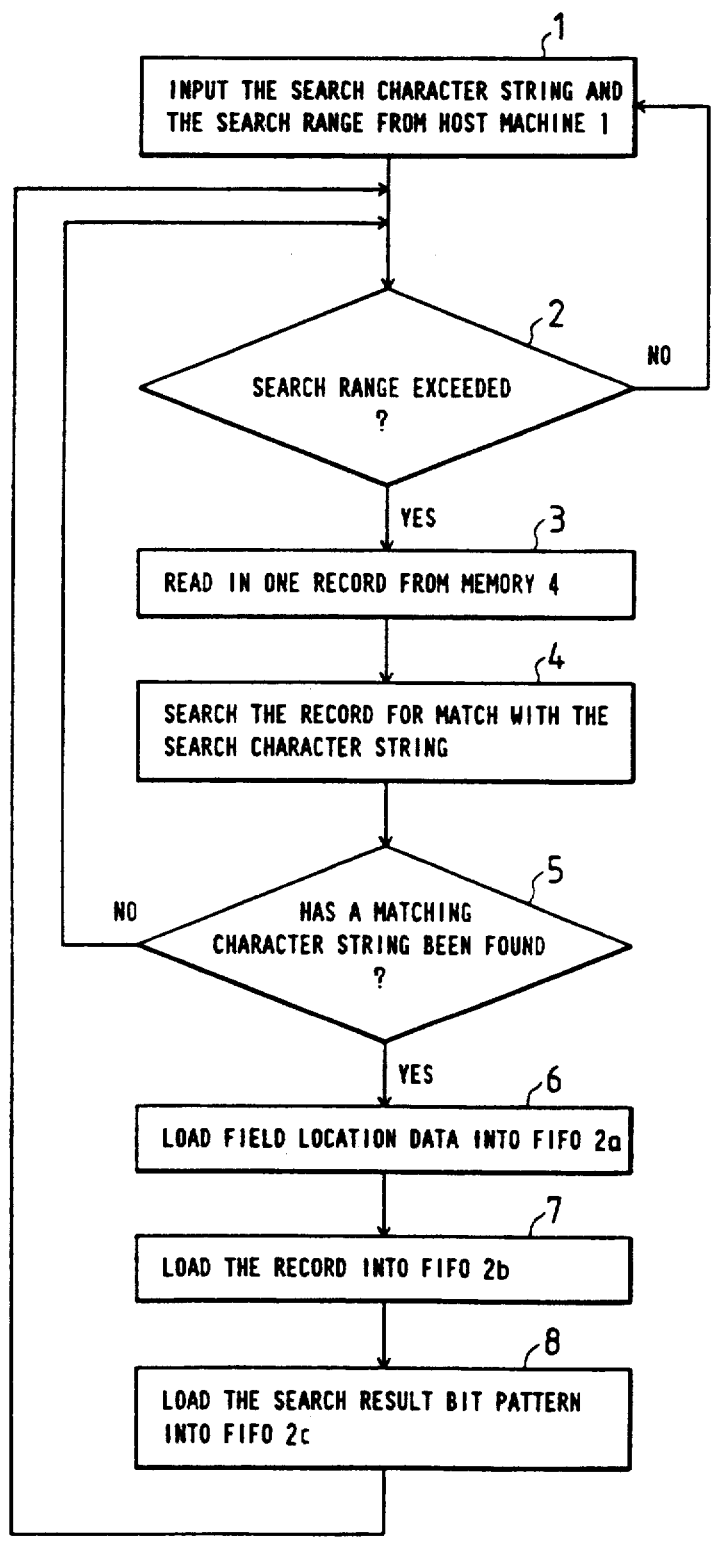

APPARATUS FOR PROCESSING RECORD-STRUCTURED DATA BY INSERTING REPLACEMENT DATA OF ARBITRARY LENGTH INTO SELECTED DATA FIELDS

BACKGROUND OF THE INVENTION

1. Field of the Invention

The present invention relates to a data processing apparatus for processing large amounts of data which are structured as successive records, for use in a system such as a database system. The apparatus is applicable to records which are formed of a variable number of data fields.

2. Description of the Related Art

In recent years, processing of structured data, in the fields of database system etc., has been increasing. The term "structured data" as used herein signifies a stream of data structured as successive records, with each of the records being structured as one or more data fields. In the prior art, such processing has been executed on a software basis, using a general purpose processor. However software processing with a general purpose processor has the disadvantage of a low processing speed. This is a particular problem if large quantities of structured data have to be processed.

SUMMARY OF THE INVENTION

It is an objective of the present invention to overcome the problems of the prior art described above, by providing a data processing apparatus which is capable of executing, at high speed, processing such as replacement of data fields within records of a structured data stream. To achieve the above objective, one embodiment of the present invention provides, in a data processing system which includes means for producing successive records to be processed, with each of the records comprising at least one field, means for producing data to be used in processing the records and commands for specifying the processing contents, means for producing field location information specifying the respective locations of the fields within a record, and for producing information specifying those fields within a record that are to be processed, a data processing apparatus for receiving and processing the records, comprising:

register means for holding the information specifying the fields to be processed;

table memory means for holding the field location information;

first memory means for storing a record which is to be processed;

second memory means for storing the data to be used in processing; and processing means for sequentially reading out successive fields of a record stored in the first memory means, and for selectively processing the fields in accordance with the commands, the data stored in the second memory means, the contents of the register means, and the contents of the table memory means.

Such a data processing apparatus can operate, for example in the case in which the data of the $n^{th}$ field of a record are to be replaced, such that successive fields of that record are outputted from the apparatus until the $(n-1)^{th}$ field of the record has been outputted, whereupon previously stored data which are to be used for replacement of one are outputted from the apparatus, then the $(n+1)^{th}$ field of that record is outputted, and so on.

BRIEF DESCRIPTION OF THE DRAWINGS

FIG. 4 is a flow chart for illustrating the operation of a host machine shown in FIG. 1;

FIG. 5 is a flow chart for illustrating the operation of a pattern matching circuit shown in FIG. 1;

DESCRIPTION OF PREFERRED EMBODIMENTS

Figure 1:
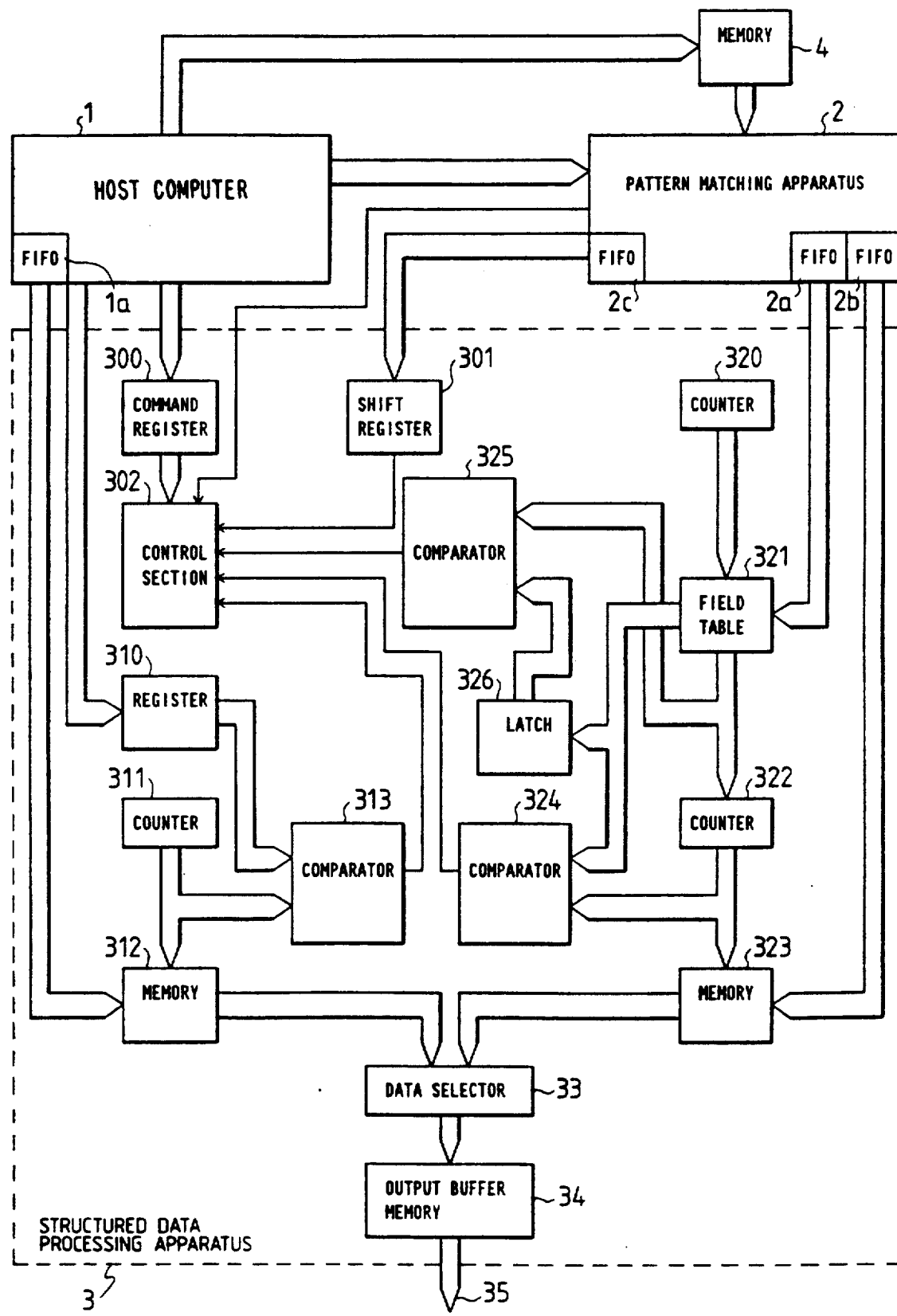
FIG. 1 is a block diagram showing a first embodiment of a structured data processing apparatus according to the present invention; and, FIG. 2 is a diagram for illustrating the configuration of each record processed by the embodiment of FIG. 1.
Figure 2:
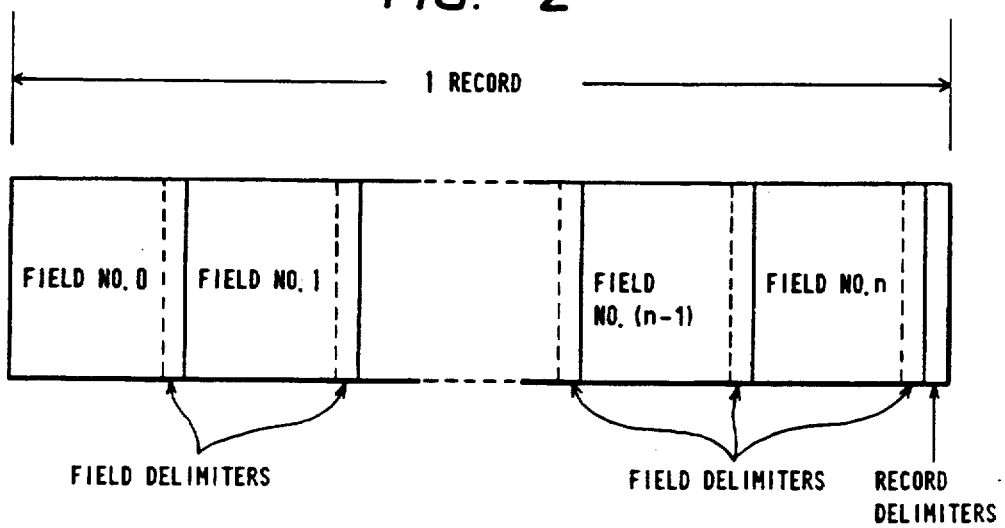

FIG. 1 is a block diagram of a system which is based on a data processing apparatus according to the present invention, the data processing apparatus being denoted by reference numeral 3. Structured data are stored in a memory 4, the data being structured as units of records, each record containing at least one data field, and the number of fields per record being within a predetermined maximum value, which will be assumed to be 15 in the following. The structure of a record is illustrated in FIG. 2. As shown, a record consists of n fields, numbered from field 0 to field n, and a record delimiter. The record delimiter is handled during such operations as memory writing and reading of the record, counting of the number of fields processed, etc., as if it were also one field. In the following description, it will be assumed that n is in the range from 0 to 14, i.e. that the maximum number of fields per record is 15, plus a record delimiter. The records are successively read out from the memory 4 and transferred to a pattern matching apparatus 2, which searches the successively supplied records for pattern matching with a specific string of characters and/or numerals (which will be referred to in the following simply as a character string). The character string that is to be searched for is supplied from a host computer 1, together with information specifying the search range, i.e. the leading and trailing addresses in the memory 4 of a set of records that are to be sequentially searched. Thereafter, these records are sequentially supplied to the pattern matching apparatus 2 from the memory 4, and when a record is found which contains one or more fields which contain the specified character string, the pattern matching apparatus 2 loads the data of that record into a queue buffer consisting of FIFO (first in first out) memory 2b, to be subsequently supplied to the structured data processing apparatus 3. The structured data processing apparatus 3 thereafter executes any necessary processing of the record, such as replacement of the data of each field which has been found to contain the specified character string, by predetermined other data. The structured data processing apparatus 3 outputs each record thus processed, to an external apparatus, via an output buffer memory 34.

Each record supplied from the pattern matching apparatus 2 is stored in a memory 323 of the structured data processing apparatus 3. In addition, when a record is supplied to the structured data processing apparatus 3, the pattern matching apparatus 2 also loads into a shift register 301 a bit pattern which represents the results of searching that record. Specifically, each bit of the pattern is set to either the "1" or the 0" logic state in accordance with whether or not a corresponding field of the record is to be processed by the structured data processing apparatus 3 or is to be transferred through the structured data processing apparatus 3 without change. When this bit pattern is loaded into the shift register 301, the leftmost bit is set to a specific state (e.g. the "1" state) if the first field (field 0) of the record is to be processed and to the 0 state of the field is not to be processed, a similar state is established for second bit from the leftmost end of shift register 301 to indicate whether or not the second field (field 1) of the record is to be processed, and so on. For each record which is to be processed, pattern matching apparatus 2 also loads into a field table 321 of the structured data processing apparatus 3 (via a FIFO buffer 2a) a set of field location data, representing the locations at which respective fields of the record are to be stored in the memory 323. Specifically, this field location data consists of an address pair (a leading and a trailing address) for each field. When a record is transferred from the FIFO 2b, it is stored in these specific addresses of the memory 323, the address values being successively read out from the field table 321.

The host computer 1 outputs to the structured data processing apparatus 3 a command code, for designating the type of processing which is to be executed on each field of an input record which has been found to require processing by the structured data processing apparatus 3. In the following, only replacement processing will be described, where each of one or more fields of the original record is replaced by a field of other data that are supplied from the host computer 1 (via a FIFO queue buffer 1a) and stored in a memory 312. However it will be apparent that the invention is not limited to replacement processing, and that the embodiment could be adapted for other types of processing. The command code designating the processing that is to be executed is supplied from the host computer 1 to be stored in and decoded by a command register 300. The decoded command contents are supplied to a control section 302, which generates control signals for executing various control functions. These control signals are generated based upon the contents of commands held in the 300 and upon signals which are produced from the shift register 301, a comparator 313 and a comparator 324 and are supplied to the control section 302. For simplicity of description, the control signals which are produced from the control section 302 for executing such control are omitted from the drawings. A counter 311 serves as an address counter for the memory 312, which stores replacement data for a single field.

A register 310 receives from the host computer 1 the size (i.e. trailing address) of field replacement data which are to be stored in the memory 312. During writing or readout of data by the memory 312, the comparator 313 compares that trailing address with the current address count of the counter 311 (which is reset to a count of zero prior to a read or write operation of the memory 312).

A table address counter 320 counts the number of fields whose addresses have been loaded into field table 321 or have been read out from the field table 321, i.e. functions as an address counter for the field table 321. During readout from the field table 321, the field table 321 supplies to the address counter 322 the value of the leading address at which a field is stored in the memory 323, and supplies the trailing address of the field to the comparator 324. In addition to functioning as an address counter for the memory 323, the address counter 322 also supplies the address count value to the comparator 324. The comparator 324 serves to compare the leading address value produced from the field table 321 with the address value produced from the address counter 322.

Each trailing address value read out from the field table 321 is also inputted to a latch 326, and the corresponding leading address is inputted to a comparator 325, to be compared thereby with the output from the latch 326.

A data selector 33 selectively outputs either data which are produced from the memory 312 or data supplied from the memory 323, under the control of a signal produced from the control section 302. The output buffer memory 34 temporarily holds the data which are outputted from the data selector 33, and outputs these data following completion of processing a record, as the final results from the structured data processing apparatus 3.

Figure 3:
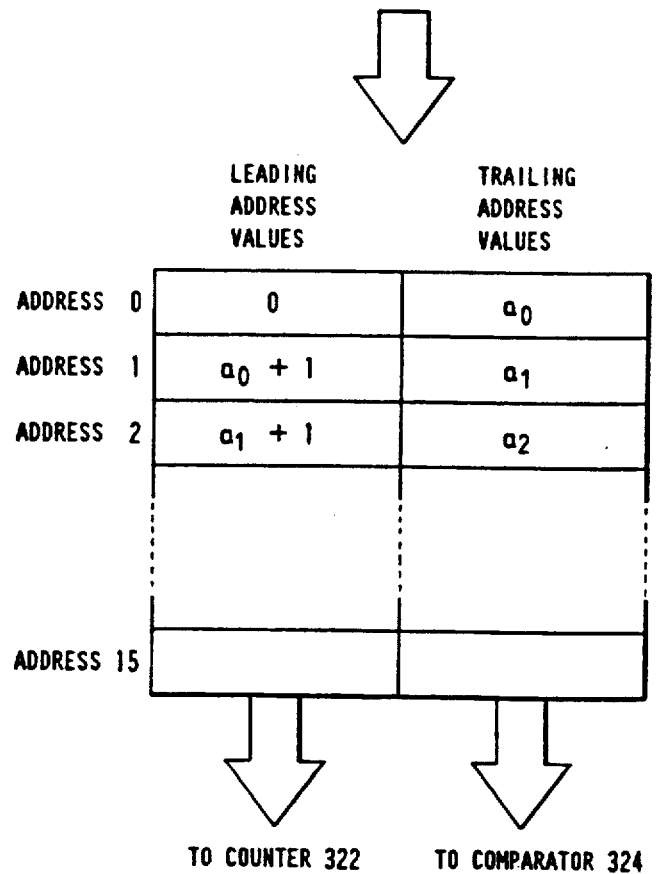
FIG. 3 illustrates the manner in which field location data are stored in a field table of the apparatus of FIG. 1.

The manner in which leading address and trailing address values are stored in the field table 321 is illustrated in FIG. 3. As shown, each table address stores two values, respectively representing the leading address and the trailing address at which a field is stored in the memory 323. The first address of the field table 321 is 0, and the table addresses extend from 0 to 15, so that each table address is also a field number.

The operation of this apparatus is as follows. The memory 4 will be assumed to contain a plurality of files stored therein, each of which occupies a continuously extending storage region of the memory 4. Each file consists of a set of records, stored in successive regions (i.e. consecutive sets of addresses) of the memory 4. It will also be assumed that the user can designate to the host computer 1 that one of these files is to be searched for a specific character string referred to in the following as the search character string (which is specified by the user, who inputs that character string to the host computer 1), and that when a record containing that character string is found, the record is to be processed by replacing the contents of each field containing the search character string by specific data (which the user also inputs to the host computer 1). The operations executed by the host computer 1 in this case are illustrated by the flow chart of FIG. 4. Firstly, in step 1, the host computer 1 waits until the user specifies a search character string and the name of a file which is to be searched. (Step 1 is shown as a decision loop only for the purpose of description, and the host computer could of course be executing other operations while waiting for a search operation to be designated.) If a search is specified, the host computer 1 then, in step 2, transfers the search character string to the pattern matching apparatus 2. In step 3 the host computer 1 determines, from the specified file name, the initial address of the region of the memory 4 in which that file is stored, and supplies that initial address value to the pattern matching apparatus 2. In step 3, the host computer 1 similarly determines the end address of the region of the memory 4 in which that file is stored, and supplies that final address value to the pattern matching apparatus 2. Next, in step 4, the host computer 1 loads the data which have been specified by the user for field replacement, into the FIFO 1a. In the succeeding step 5, the host computer 1 loads the size of the field replacement data (i.e. the number of addresses that the data will occupy in the memory 312) into the register 310. Then in step 6, a command code designating the required processing (i.e. field replacement) is supplied from the host computer 1 to the command register 300 of the structured data processing apparatus 3.

Figure 6A:
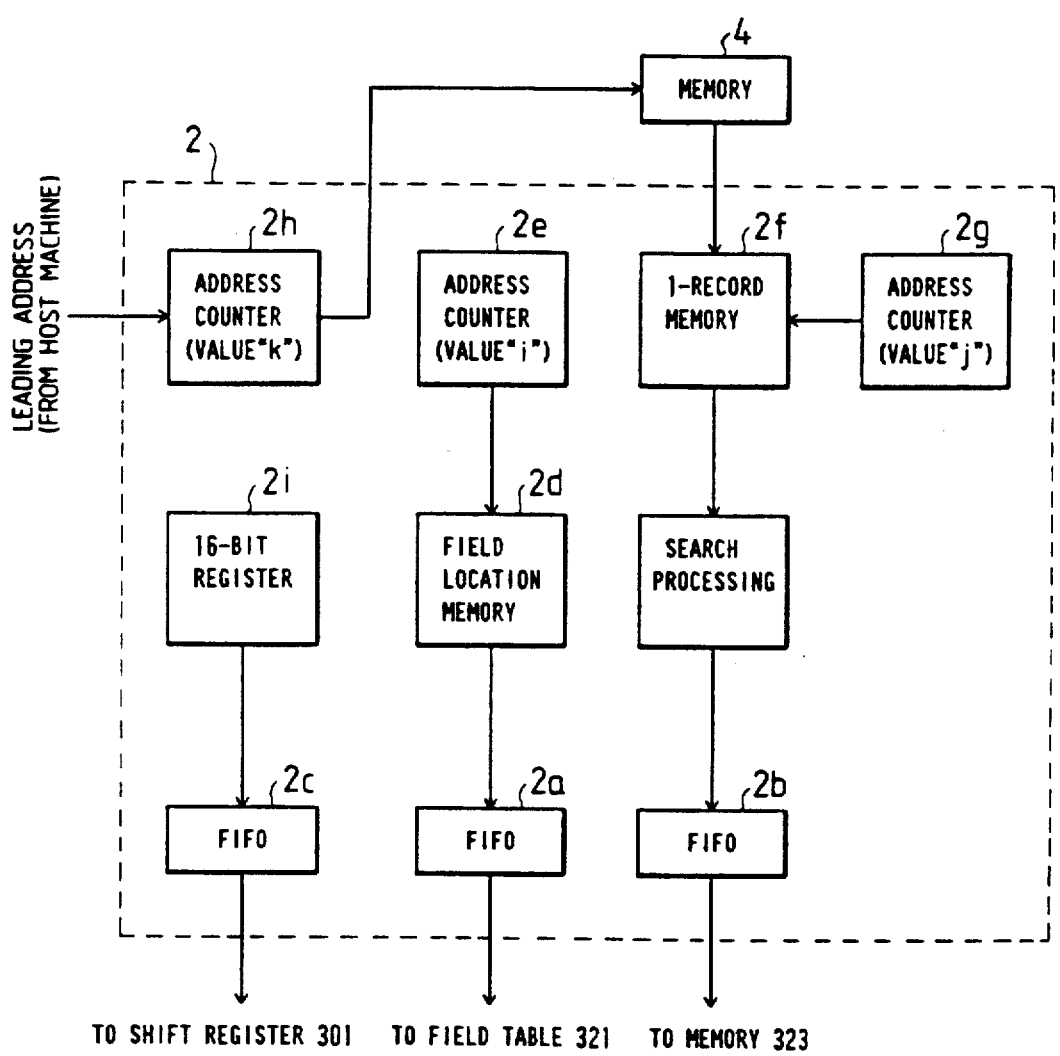
FIG. 6(a) is a conceptual block diagram for assistance in describing data transfer operations of a pattern matching circuit in FIG. 1.
Figure 7:
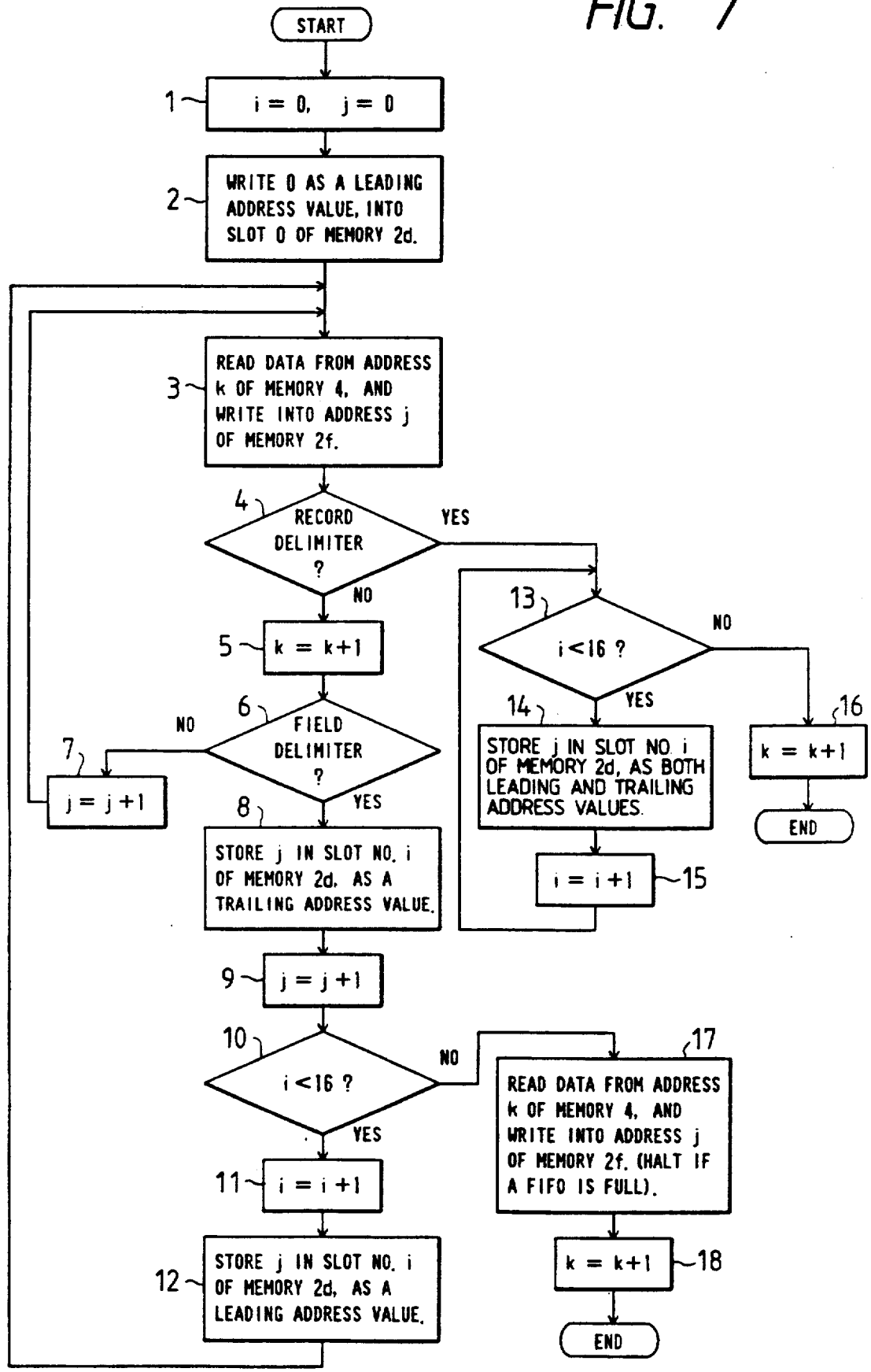
FIG. 7 is a flow chart for illustrating data transfer operations executed by the pattern matching circuit of FIG. 1.

FIG. 6(a) is a conceptual block diagram for assistance in describing the operation of the pattern matching apparatus 2, in conjuction with the flow chart of FIG. 7. Addresses for reading data from the memory 4 into the pattern matching apparatus 2 are supplied from a counter 2h, with the leading and trailing addresses for such readout being supplied from the host computer 1 as described hereinabove. Each record that is supplied from the memory 4 is held in a memory 2f during search processing, with addresses in the memory 2f being specified by a counter 2g. The aforementioned field location information that is supplied to the field table 321 of the structured data processing apparatus 3 is stored temporarily in a field location memory 2d before being transferred to the FIFO memory 2a.

Figure 6B:
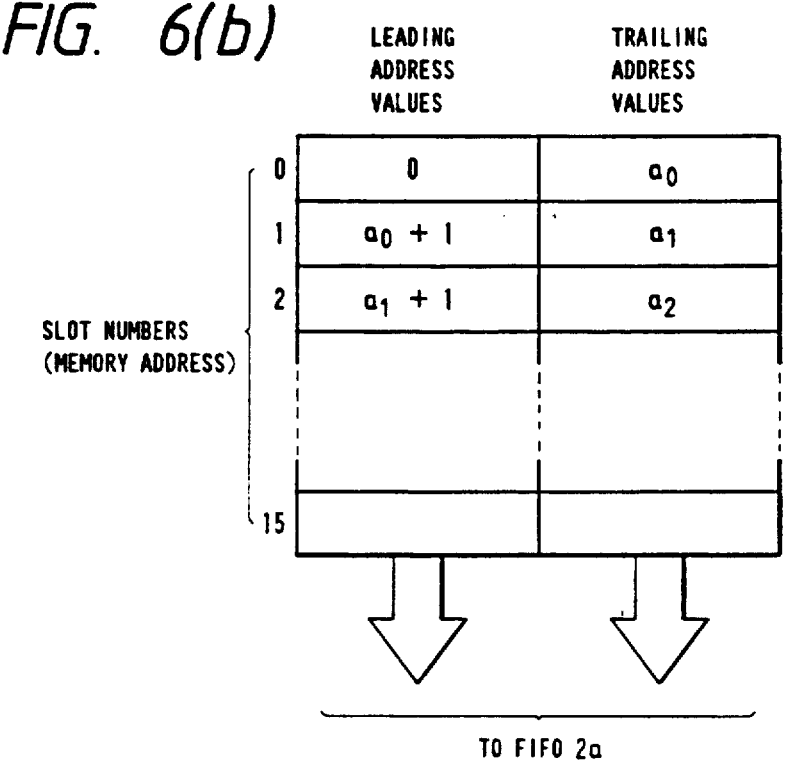
FIG. 6(b) is a diagram illustrating the manner of storing field location data in a slot memory of the pattern matching circuit.

The general form in which the field location information is stored in the field location memory 2d is illustrated in FIG. 6(b). As shown, the leading address and trailing address values of successive fields of a record are stored, as an address value pair, in successively corresponding locations of the field location memory 2d, which are referred to as slots. The slot numbers (i.e. the addresses in the field location memory 2d) extend from 0 to 15, so that the slot numbers are also field numbers.

The aforementioned 16-bit pattern which represents the results of searching a record for the search character string is assembled in a 16-bit register 2i. The 16 bits of the register corresponds to respective specific ones of the fields, i.e. the bits from the LSB to the MSB of the register correspond to fields 0 to 15 respectively (including the record delimiter). If during search processing of a record, the search character string is found within one or more fields of the record, then the corresponding bits of the register 2i are set to the "1" state, and the contents of the register 2i are transferred to the FIFO 2c upon completion of the search processing. As soon as the structured data processing apparatus 3 completes processing of one record, the register 2i data for the next record to be processed are transferred from the FIFO 2c to the shift register 301.

It should be noted that FIG. 6(b) is provided only for ease of description, and that the blocks shown therein represent only one part of the functions performed by the pattern matching apparatus 2. Furthermore, although separate blocks are shown, all or part of these functions may in practice be implemented by a single processor and memory.

FIG. 7 is a flow chart for assistance in describing the operations executed by the pattern matching apparatus 2 for step 6 of FIG. 5, occurring when one record is transferred from the memory 4 to the pattern matching apparatus 2. The count values (i.e. memory address values) of the counters 2e, 2g and 2h of FIG. 6(a) are designated as i, j and k respectively. The initial value of k is determined by the address information supplied from the host computer 1, as described above, and this value is incremented by one each time the steps shown in FIG. 7 are executed. The initial values of i and j are each set to zero in step 1. In step 2, this zero value is written into slot 0 of the slot memory 2d, as the leading address value for the first field of the record. In step 3, data are written from address k of the memory 4 into address j of memory 2f. If the record delimiter is not detected in step 4, then k is incremented, and a check made for a field delimiter in step 6. If a "no" decision occurs, then data continues to be written into the memory 2f. If the end of a field has been reached, then j is stored in slot No. i of memory 2d (which is initially No. 0), as the trailing address value for that field. j is then incremented, and if less than 15 fields plus one record delimiter have been read in, then processing proceeds to step 11, in which i is incremented. j is then stored in slot No. i as the next leading address value, and operation returns to step 3. Data of one record are thereby written into memory 2f.

If the (number of fields + record delimiter) of the record is a value n which is less than 16, then steps 13 to 16 function to load into each of the slots of memory 2d, from the $(n+1)^{th}$ to the $16^{th}$, the value j. In this way, each of these slots contains the final address of the counter 2g, i.e. the size of the record (since counter 2g counts from 0). j is loaded into each slot as both a leading address and a trailing address value.

In step 17, the record delimiter is written into address j of the memory 2f. k (counter 2h) is then incremented, completing the process of writing one record into memory 2f from the memory 4.

The overall operation of the embodiment for processing a record is as follows. The command contents are decoded by the command register 300 and supplied to the control section 302. The data which are to be used for field replacement are supplied from the host computer 1, via the FIFO 1a, to be stored in successive addresses of the memory 312. Immediately prior to the commencement of this storage of data into the memory 312, the address count in the counter 311 is cleared to zero, by a control signal applied from the control section 302, and storing of the replacement data into successive addresses of the memory 312 (i.e. addresses specified by count values of the counter 311) is then executed, beginning at address 0. While this storage into successive addresses is being executed, the size information that is being held in the register 310 is compared with the count value of the counter 311, by the comparator 313. When the size value and the count value of the counter 311 are found to coincide, the comparator 313 sends a signal indicative of this condition to the control section 302. Control signals are thereby produced from the control section 302 which terminate the storing of data into the memory 312.

When the pattern matching apparatus 2 detects the search character string within a record, and loads the record into the FIFO 2b as described above, the pattern matching apparatus 2 also sends a signal to the control section 302 of the structured data processing apparatus 3 to indicate this. The following operations are subsequently executed under the control of the control section 302 with respect to that record. First, a control signal is produced for resetting the count of the table address counter 320 to zero. The pattern matching apparatus 2 then successively transfers to the field table 321, via the FIFO 2a, the aforementioned field location data representing respective values of leading address and trailing address for each of the fields of the record which is to be processed (i.e. "leading adress" signifying an address of the memory 323 at which storage of data of the field in the memory 323 will begin, and "trailing address" signifying the final address for that data storage). These values of leading address and trailing address are stored in successive addresses of the field table 321, from address 0, by successively incrementing the table address counter 320, from 0 to 15. Thus upon completion of this operation, each address of the field table 321 contains the leading address and trailing address for a corresponding field of the record that is to be processed (and one record delimiter), so that each of the count values of the field table 321 from 0 to 15 signifies both an address of the field table 321 and also a field number of the record which is to be processed.

As stated above, the maximum number of (fields+record delimiter) per record is 16 in this embodiment. If the number is exactly 16, then upon completion of the above operation of storing leading addresses and trailing addresses in the field table 321, the final count value of the table address counter 320 will be 15, which represents the address in the field table 321 at which is stored the leading address and trailing address of the field delimiter of the record to be processed. However if there are fewer than 16 (fields+record delimiter) in that record, then during the above process of storing leading address and trailing address values in the field table 321, when the leading address and trailing address values for the record delimiter of the record have been stored in the field table 321, the trailing address value for the record delimiter is thereafter written into each of the remaining addresses of the field table 321. That is, instead of writing a leading address/trailing address value pair into each of these remaining addresses of the field table 321, a trailing address/trailing address pair is written into each, with the trailing address value being that of the record delimiter.

As described hereinabove, FIG. 3 illustrates the manner in which leading addresses and trailing addresses are stored in the addresses from 0 to 15 of the field table 321. If each table address stores 8 bits, for example, then four of these bits (a leading address) are read out to the address counter 322, and the remaining four bits (a trailing address) are read out to the comparator 324 and also to the latch 326. Upon completion of writing a field into the memory 323, the trailing address of that field is latched into the latch 326, i.e. the latch 326 always contains the trailing address of the immediately preceding field.

Upon completion of storing the leading addresses and trailing addresses of a record in the field table 321, loading of data of the respective fields of the record into the memory 323 is initiated. During this memory loading process, the count of the table address counter 320 is held fixed at the final address value of 15. The data of the respective fields, from field No. 0 to the record delimiter, are then written into successive addresses of the memory 323 starting from address 0, by successively incrementing the address counter 322 while supplying the data of the record from the FIFO 2b of the pattern matching apparatus 2. The address count values from the address counter 322 are inputted to the comparator 324 as well as to the memory 323. In addition, the trailing address which is stored at the address in the field table 321 designated by the table address counter 320 is continuously inputted to the comparator 324 at this time. Since the count of the table address counter 320 is held at 15 during loading of data into the memory 323 as stated above, this value of trailing address is that of the record delimiter of the record that is being loaded. Thus, when the comparator 324 detects coincidence between address value that is currently being produced from the address counter 322 and the trailing address of the record delimiter, the comparator 324 sends a coincidence signal to the control section 302. The control section 302 thereby generates control signals for terminating the loading of data into the memory 323.

The shift register 301 has 16 stages. As described hereinabove, the bit pattern representing the search results obtained for the record which is to be processed has been loaded into the shift register 301 from the FIFO 2c of the pattern matching apparatus 2. On completion of this loading operation, the leftmost stage of the shift register 301 produces a "1" or a "0" level output signal (supplied to the control section 302) in accordance with whether or not the first field of the record is to be processed, and the remaining stages of the shift register 301 (from left to right in succession, as viewed in FIG. 1) are similarly set in the "1" or "0" state in accordance with whether or not corresponding ones of the fields are to be processed by the structured data processing apparatus 3.

When the above operations of storing in the field table 321 the field location information for a record which is to be processed, storing the data of the record in successive adds of the memory 323, and setting the respective bit states of the stages of the shift register 301, have been completed, processing of the record stored in the memory 323 begins, as follows. Firstly, the control section 302 produces a signal for resetting the table address counter 320 to a count of zero. For the purpose of description it will first be assumed that the leftmost bit of the shift register 301 at this time is in the "0" state, indicating that the first field of the record is to be left unprocessed. During the output operation, the field table 321 supplies a trailing address (from the location in table field table 321 specified by the table address counter 320 count) to the comparator 324, and inputs the corresponding leading address to the address counter 322. When output operations begin, this leading address is loaded into the address counter 322 as an initial count value, and thereafter the address counter 322 is successively incremented so that successive data of the first field of the record stored in the memory 323 are read out and transferred to the data selector 33. At this time, since the leftmost bit of the shift register 301 is in the "0" state, the control section 302 responds by producing control signals whereby the data produced from the memory 323 are transferred directly through the data selector 33 to the output buffer memory 34. While this is done, the control section 302 supplies a "write" control signal to the output buffer memory 34, to load the data from the memory 323 therein. This process continues with successive increments of the address counter 322, until the count value of the address counter 322 becomes identical to the trailing address that is being outputted from the field table 321. When this condition occurs, the comparator 324 supplies a corresponding input signal to the control section 302, which responds by generating control signals for terminating readout of data of the first field from the memory 323.

If on the other hand the leftmost bit of the shift register 301 is in the "1" state at the start of the output operation, indicating that the data of the first field of the record stored in the memory 323 are to be replaced, then the 302 first generates a control signal for resetting the counter 311 to a count of zero, and then to successively increment the counter 311 to thereby read out the stored data for one field, from the memory 312, starting from address 0 of the memory 312. The control section 302 also generates control signals whereby these data are transferred through the data selector 33 to the output buffer memory 34 and written therein. When the comparator 313 detects that the size value (i.e. final address value) held in the register 310 and the address count of the counter 311 have coincided, it sends a signal indicative of this to the control section 302, whereby the control section 302 produces control signals for terminating the output operation for the first field.

In this way, the original data of the first field of the record which was loaded into the 323 have been replaced by the data stored in the memory 312.

Upon completion of the output operation for the first field in this way, the table address counter 320 is incremented by one, and a 1-bit left-shift operation of the 301 is executed. The "1" or "0" state of the output from the leftmost stage of the shift register 301 now indicates whether or not the data of the second field are to be replaced, and the output operation described above is then repeated, in accordance with the state of that leftmost bit.

Such output operations are sequentially executed for the remaining fields, up to the record delimiter of the record which is stored in the memory 323. The output operations are terminated when the control section 302 detects that the count in the table address counter 320 has been incremented after reaching a value of 15.

As described above, if the number of (fields+record delimiter) of a record is less than the maximum of 16, then the the field location data that is loaded into the field table 321 from the pattern matching apparatus 2 will be such that the final trailing address of the record (i.e. the size of the record) stored in each of the $(n+1)^{th}$ to the $16^{th}$ addresses of the field table 321. Since the output from the latch 326 is always the leading address of the preceding field, after the last data of the record (i.e. the record delimiter) have been read out of the memory 323, the leading address value from the field table 321 and the output from the latch 326 will become identical. A coincidence signal is thereby produced from the comparator 325, and the control section 302 responds to this by terminating the "write" control signal that was being applied to the output buffer memory 34. Writing of data into the output buffer memory 34 is thereby terminated when the record delimiter has been stored therein.

Figure 8A:
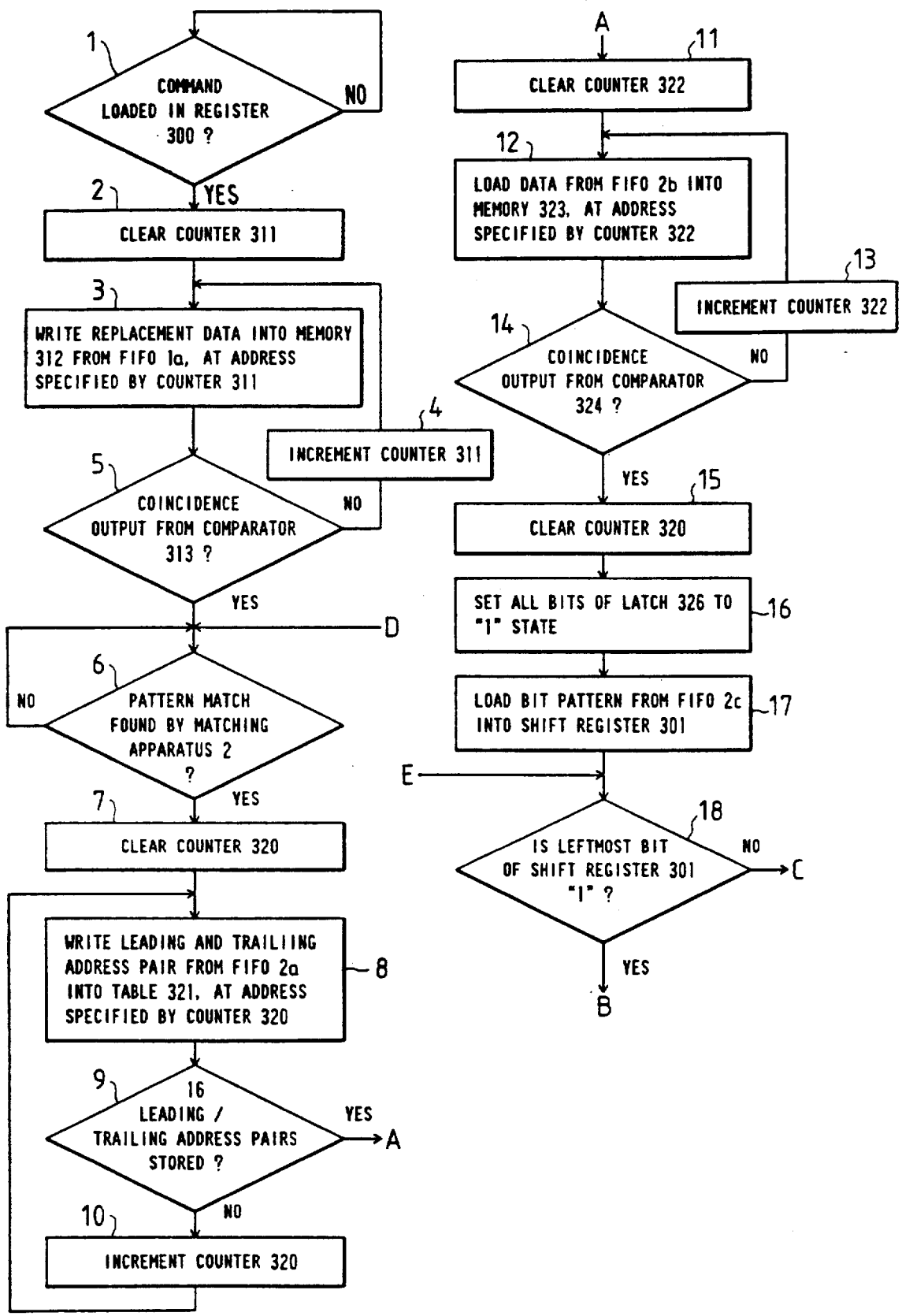
FIGS. 8(a) and 8(b) are flow charts for illustrating the operation of a control section in the embodiment of FIG. 1.
Figure 8B:
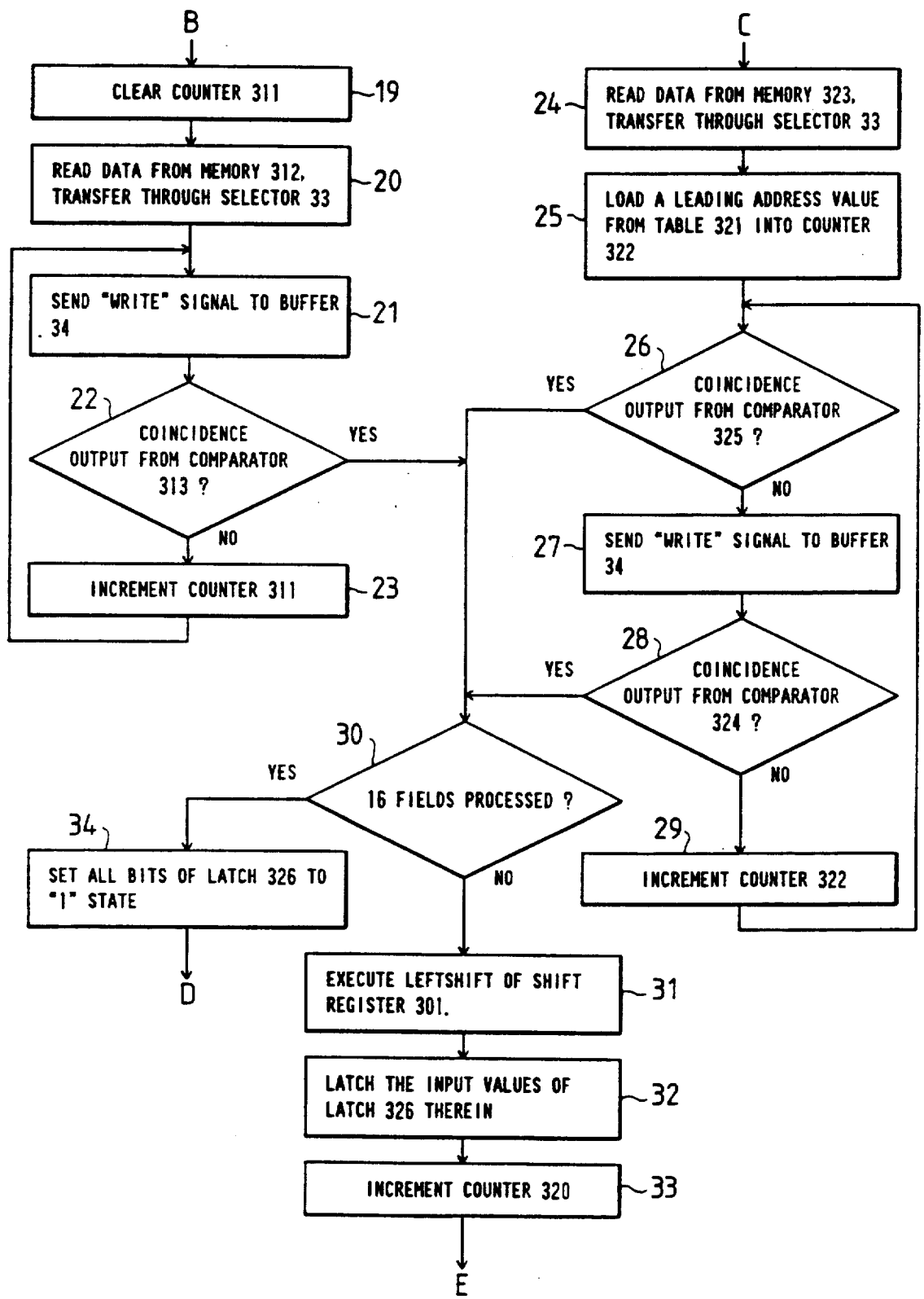

The operating flow executed by the control section 302 to implement the above is illustrated in the flow charts of FIGS. 8(a) and 8(b). In these FIGS. writing of replacement data into the memory 312 occurs in operating steps 3 to 5, control section 302 thereafter waits until a signal is sent from the pattern matching circuit 2 to indicate that a match has been found in a record, then the field location data for the record are written into the table memory 321. The record is stored in memory 323 in steps 12 to 14, the bit pattern specifying the fields to be processed is loaded into shift register 301 in step 17, and thereafter, based on the state of the bit signal produced from the leftmost stage of register 301, each field is either transferred directly from memory 323 to the buffer 34 (steps 24 to 29) or replacement data are loaded into buffer 34 from memory 312 (steps 19 to 23).

It can thus be understood that the above embodiment of the invention enables data of any arbitrary field or plurality of fields within a record to be easily replaced with other data, with information designating the specific fields that are to be replaced being loaded from the pattern matching apparatus 2 into a shift register of the structured data processing apparatus 3, and the shift register contents being used thereafter in controlling the replacement processing, and moreover with field location information being loaded into a table memory of the structure data processing apparatus 3 from the pattern matching apparatus 2, for use during replacement processing in controlling readout of data from the memory 323 in which has been stored a record that is to be processed. It can also be understood that the host computer 1, pattern matching apparatus 2 and structured data processing apparatus 3 can be mutually linked in a very simple manner by utilizing FIFO queue buffers for transferring data between them.

Figure 9:
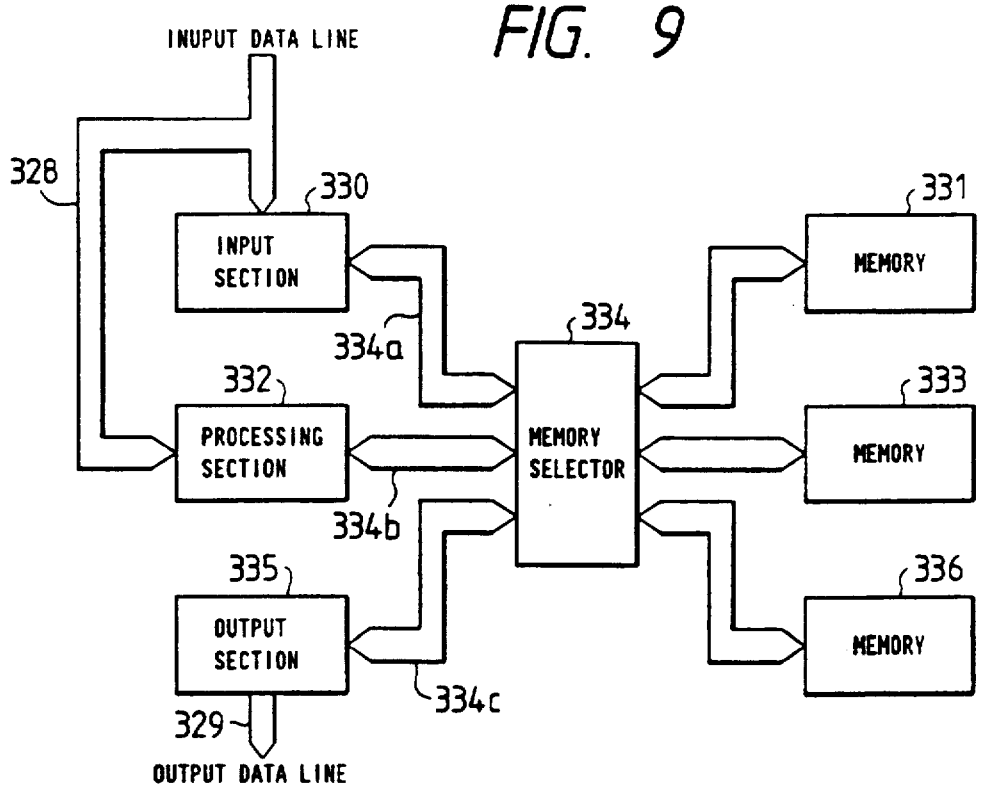
FIG. 9 is a general block diagram of a data processing apparatus according to a second embodiment of the invention.

A second embodiment of the invention is illustrated in very simple block diagram form in FIG. 9. Data in the form of successive records which are to be processed, as well as commands for designating the type of processing and data to be used in that processing, are supplied over input data lines 328, with the input records being transferred through a input section 330 and an input data line 334a to one input of a memory selector 334, and the processing commands and data to be used in processing being supplied to a processing section 332. The processing section 332 is coupled to receive records which are to be processed, and to transfer the data resulting from the processing, through a bidirectional data line 334b and the memory selector 334. In this embodiment, the processing section 332 executes both pattern search processing as described for the first embodiment above, to find records which require to be processed by data replacement, and executes the data replacement when it is necessary. An output section 335 receives the processed data, in units of records, from a data line 334c of the selector 334, and supplies these to an output data line 329. 331, 333 and 336 denote respective memory sections, each of identical configuration, and each connected to the memory selector 334 via a corresponding bidirectional data line.

At any arbitrary point in time, the input section 330, processing section 332 and output section 335 are connected to respective ones among the memory section 331, memory section 333 and memory 336. It will be assumed first that the input section 330, processing section 332 and output section 335 are connected to the memory section 331, memory section 333 and memory 336 respectively. In this condition, data of one input record are being transferred from the input section 330 to be stored in the memory section 331, while data of the immediately preceding record are being transferred to the processing section 332 to be processed and the results of the processing are being transferred back to the memory 333 to be stored therein, and the record which had been processed immediately prior to that which is now being processed is being transferred from the memory 336 to the output section 335. The memory selector 334 is controlled by a control section (not shown in the drawing), such that upon completion of processing a record by the processing section 332, the interconnections between the input section 330, processing section 332 and output section 335 and the memory section 331, memory section 333 and memory 336 are changed over. With the present example, upon completion of processing the record that is being read out, processed, and written back into the memory section 333 (at which point reading of one record out from the memory 336 and writing of one record into the memory 331 has already been completed), the memory selector 334 connects the output section 335 to the memory 333, the memory section 331 to the processing section 332, and the memory section 333 to the input section 330. In this condition, a new record is transferred to the memory 336 (which is now available, since its contents have been transferred to the output section 335), the record that has been written into the memory section 331 is processed by the processing section 332, and the processed record in the memory section 333 is transferred to the output section 335. Upon completion of record processing, switching by the memory selector 334 again takes place, and the above process is repeated.

It can thus be understood that with this embodiment, reading out from a memory (to an output data line or external apparatus) a first record which has been completely processed, processing a second record, and writing into a memory a third record which has already been processed, can be executed in parallel. Thus, rapid and efficient operation is attained, by comparison with prior art types of data processing apparatus used for such search and processing operations on structured data consisting of successive units of records. With such prior art apparatus, this form of parallel operation (i.e. time-overlapping of record input, record processing, and record output) is not possible, so that this second embodiment of the invention enables a substantial increase in overall processing speed to be achieved.

Although the second embodiment has been described for the case in which a processing section 332 executes both search and replacement processing, it would be equally possible to apply the principles of the second embodiment to a data processing apparatus such as that of the first embodiment, in which separate units execute pattern search processing and replacement processing respectively. Specifically, with the first embodiment, transferring a processed record from the output buffer memory 34 to the output line 35 can be performed in parallel with processing of the succeeding record by the structured data processing apparatus 3. However before writing in a new record to the memory 323 of the structured data processing apparatus 3 from the pattern matching apparatus 2, it is necessary to wait until processing of the preceding record by the structured data processing apparatus 3 has been completed. If the second embodiment is combined with the first embodiment such that the functions of the memory 323 (but with processed data being written back therein) and output buffer memory 34 are executed by two of the three memory sections shown in FIG. 9, and data for an input record supplied from the pattern matching apparatus 2 are assembled in a third one of these three memory sections, then the operations of outputting a processed record to the output data line 35, processing a second record, and reading in a third record from the pattern matching apparatus 2, can be performed in parallel by the structured data processing apparatus 3. In that case, the FIFO 2b of the pattern matching apparatus 2 would be connected via the data line 334a to one input of the memory selector 334, the input and output terminals of the data selector 33 would be connected to the bidirectional data line 334b of the memory selector 334, and the data output line 35 would be the output data line 334c from the memory selector 334. In a practical system, of course, respective address count values for the three memories could also be selectively transferred to the appropriate memories by the memory selector 334.

What is claimed is:

1. A data processing system for receiving successive records of a file and for executing updating processing of specific ones of said records, each of said records comprising plural data fields each immediately preceded by and succeeded by a delimiter, said apparatus comprising a one-record memory and means for sequentially writing successive ones of said records into said memory;

first field location means for (a) detecting said delimiters in a record that is written into said one-record memory, to thereby derive field location information specifying addresses in said memory of respective ones of said fields, and (b) holding said information after writing in of said record has been completed;

means for deriving replacement data to be inserted into at least one field of at least one of said specific records;

second field location means for detecting a record for which said field data replacement is to be executed and for producing information designating a position of said field which is to be replaced; and data outputting means for reading out said contents of a record that has been written into said one-record memory and transferring said contents to output circuit means, said data outputting means being responsive to said information derived by said first and second field location means when said record is detected as being one of said specific records for (a) halting said reading out and transferring of record contents at a start of a field which is to be replaced, (b) then transferring said replacement data to said output lines, and (c) then recommencing said reading out and transferring of record contents at a start of a field which immediately succeeds said field that is to be replaced.

2. The data processing system of claim 1, wherein said means for detecting said specific records comprises pattern matching means for comparing said contents of each field of each of said records with a predetermined set of data.

3. The data processing system of claim 2 wherein said pattern matching means comprises a second one-record memory for sequentially holding each of said records prior to writing in of said each record to said first-mentioned one-record memory, said second one-record memory having an identical sequence of address values to that of said first-mentioned one-record memory, said first field location means (a) detecting successive ones of said delimiters during writing-in of a record to said second one-record memory, and (b) including a field table into which are set, as said field location information, respective leading and trailing memory address values that are derived as a result of said detection.

4. The data processing apparatus of claim 1 wherein said second field location means includes a shift register into which said information specifying a field to be processed is set as a bit pattern, said bit pattern being loaded into said shift register when a record is written into said one-record memory, and further comprising means for executing a one-bit shift operation of said shift register each time a record field is read out from said one-record memory for thereby obtaining an output signal from said shift register which selectively designates whether a field which is about to be read out from said one-record memory is to be replaced by said replacement data.

5. A data processing apparatus comprising:
an input section for (a) receiving a data stream which includes data structured in units of record, and (b) transferring successive records to be derived therefrom, said data being structured such that one record is formed of a set of one or more fields;
a processing section for (a) receiving said input data stream and executing search processing in units of records, based upon search data in said input data stream and (b) executing processing of records which are found by said search processing;
an output section for deriving said results of processing obtained from said processing section, in units of records; said input, processing, and output sections operating mutually independently;
first, second and third mutually independent memory sections; and
memory selector means for selectively connecting said input section, processing section and output section to respective ones of said first, second and third memory sections, said processing section functioning during a processing operation to process data of a record contained on a one of said memory sections connected thereto and to store a newly processed record back into said memory section upon completion of said processing operation, said input section storing a new record in said memory section connected thereto during said processing operation, said output section receiving a previously processed record from said memory section connected thereto during said processing operation; said memory selector connecting, upon completion of said processing operation to connect said memory section containing said new record to said processing section, (a) said memory section containing said newly processed record to said output section and (b) said memory section containing said previously processed record to said input section.

* * * * *